United States Patent Office 3,047,581
Patented July 31, 1962

3,047,581
SUBSTITUTED ISOXAZOLYL COMPOUNDS
Thomas Samuel Gardner, Rutherford, John Lee, Montclair, and Edward Wenis, Leonia, N.J., assignors to Hoffmann-La Roche Inc., Nutley, N.J., a corporation of New Jersey
No Drawing. Filed Jan. 16, 1961, Ser. No. 82,702
4 Claims. (Cl. 260—307)

This invention relates to novel chemical compounds. More particularly, it relates to novel heterocyclic compounds characterized broadly in that they are methyl-isoxazolecarboxamides substituted in the acyclic nitrogen atom by a methyl-isoxazolyl radical. In aspect of the invention the methyl-isoxazolecarboxamide radical is either a 3-methyl-5-isoxazolecarboxamide radical or a 5-methyl-3-isoxazolecarboxamide radical. The methyl-isoxazolyl radical is either a 5-methyl-3-isoxazolyl radical or a 3-methyl-5-isoxazolyl radical.

In references herein to the isoxazolyl structure, the number system employed is that of System No. 118 in the "Ring Index" Patterson et al. (1960). For the purposes of illustrating this numbering system the following schematic (i.e. showing only the ring atoms of the heterocyclic rings and not the hydrogens attached thereto) formula, representing the compounds of the invention, is set forth:

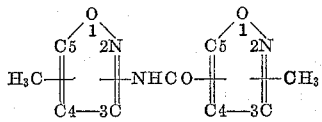

The methyl-isoxazolyl groups on either side of the amide linkage can be the same or different, in the sense that the position of the methyl group on the respective isoxazolyl rings can be the same or different and the isoxazolyl rings can be bonded to the amide linkage at the same or different position carbon atoms.

The novel compounds of the invention are useful as medicinal agents, more particularly as diuretic agents and as hypoglycemic agents. They can be administered internally, for example orally, and can be compounded into conventional pharmaceutical forms, for example, tablets, capsules, suspensions and the like.

The novel compounds of the invention can be made by processes which comprise reacting a methyl-isoxazolyl-carbonyl halide, with an amino-methyl-isoxazole. Thus, in one preferred aspect of the invention, 3-methyl-5-isoxazolyl-carbonyl chloride is reacted with 3-amino-5-methyl-isoxazole to yield N-(5-methyl-3-isoxazolyl)-3-methyl-5-isoxazole carboxamide. In place of the 3-methyl-5-isoxazolyl carbonyl-chloride, other halides, e.g. 3-methyl-5-isoxazolyl-carbonyl bromide, can be used. The reaction can be conducted in the presence of an inert solvent, e.g., water, ether, benzene, dioxane and the like. It is preferable, though not essential, to conduct the reaction in the presence of an acid-acceptor, such as an alkali metal hydroxide, e.g. dilute sodium hydroxide, or a basic organic compound, for example an amine such as pyridine, picoline or the like. Advantageously the solvent can be bifunctional, serving both as a solvent and acid-acceptor. Preferred as such bifunctional solvents are organic ases, for example amines such as pyridine, picoline or the like.

The invention is further disclosed in the following examples, which are illustrative but not limitative thereof. Temperatures are stated in degrees centigrade.

Example 1

245 grams (2.5 moles) of 3-amino-5-methyl-isoxazole was dissolved in 1,000 ml. of dry pyridine. The solution was cooled to 0–5°, and over a period of one hour, 370 grams (2.5 moles) of 3-methyl-5-isoxazolyl-carbonyl chloride was slowly added to it with the internal temperature being maintained at 0–5°. The reaction solution was permitted to stir for 14 hours and then cooled to −10°. The product was separated by filtration and then washed on a filter with 500 ml. of cold water and twice with cold ethanol, using 500 ml. for each washing. Crystallization of the precipitate from ethanol yielded N-(5-methyl - 3 - isoxazolyl) - 3 - methyl - 5 - isoxazolecarboxamide melting at 209–210°. Crystalization was also conducted from other common solvents, e.g. acetic acid.

Example 2

Using the procedure described above in Example 1 and using 3-methyl-5-isoxazolyl-carbonyl chloride and 5-amino-3-methyl isoxazole as the reactants, N-(3-methyl-5-isoxazolyl) - 3 - methyl - 5 - isoxazolecarboxamide melting at 226–228° was obtained.

Example 3

Using the same procedure as described above in Example 1 and using 5-methyl-3-isoxazolyl carbonyl chloride and 5-amino-3-methyl-isoxazole as the reactants, N-(3 - methyl - 5 - isoxazolyl) - 5 - methyl - 3 isoxazolecarboxamide melting at 176–177° was obtained.

Example 4

Using the same procedure as described above in Example 1 and using 5-methyl-3-isoxazolyl-carbonyl chloride and 3-amino-5-methyl-isoxazole as the reactants, N-(5 - methyl - 3 - isoxazolyl) - 5 - methyl - 3 - isoxazolecarboxamide melting at 153–154° was obtained.

We claim:
1. N - (5 - methyl - 3 - isoxazolyl) - 3 - methyl - 5-isoxazolecarboxamide.
2. N - (3 - methyl - 5 - isoxazolyl) - 3 - methyl - 5-isoxazolecarboxamide.
3. N - (3 - methyl - 5 - isoxazolyl) - 5 - methyl - 3-isoxazolecarboxamide.
4. N - (5 - methyl - 3 - isoxazolyl) - 5 - methyl - 3-isoxazolecarboxamide.

References Cited in the file of this patent
UNITED STATES PATENTS
2,088,995    Hoffer _____ Aug. 3, 1937